United States Patent [19]
Christensen et al.

[11] Patent Number: 5,333,097
[45] Date of Patent: Jul. 26, 1994

[54] DISK DRIVE HOLDER AND INTERCONNECTION SYSTEM

[75] Inventors: Gordon Christensen, Manteca; John Marceca, San Jose, both of Calif.

[73] Assignee: Digital Equipment Corporation, Maynard, Mass.

[21] Appl. No.: 900,329

[22] Filed: Jun. 18, 1992

[51] Int. Cl.⁵ .......................... H05K 7/10; H05K 7/14
[52] U.S. Cl. .................................... 361/685; 361/726; 361/727
[58] Field of Search ................ 439/157, 160; 360/137, 360/98.04; 364/708, 708.1; 361/380, 390-395, 399, 679-686, 724-727, 752, 755, 796, 797, 801, 802

[56] References Cited

U.S. PATENT DOCUMENTS

| | | | |
|---|---|---|---|
| 2,514,246 | 7/1950 | Knox | 439/160 X |
| 2,897,033 | 7/1959 | Ford | 439/157 X |
| 2,944,864 | 7/1960 | Krivulka | 361/391 X |
| 4,754,397 | 6/1988 | Varaiya et al. | 364/708 X |
| 4,853,830 | 8/1989 | Corfits et al. | 361/391 |
| 4,922,125 | 5/1990 | Casanova et al. | 361/391 X |
| 4,937,771 | 6/1990 | Rumps, Jr. et al. | 361/380 X |
| 4,937,806 | 6/1990 | Babson et al. | 361/391 X |
| 4,967,311 | 10/1990 | Ferchau et al. | 361/395 |
| 4,980,800 | 12/1990 | Furuta | 361/391 |
| 5,010,426 | 4/1991 | Krenz | 361/391 X |
| 5,020,151 | 5/1991 | Sampei et al. | 361/391 X |
| 5,045,960 | 9/1991 | Eding | 361/391 X |
| 5,080,452 | 1/1992 | Tuckman | 364/708 X |

FOREIGN PATENT DOCUMENTS 2594997 8/1987 France .................. 361/685

OTHER PUBLICATIONS

IBM Technical Disclosure Bulletin, vol. 28, No. 7, Dec. 1987, pp. 2785-2798, "Industrial Personal Computer For Class C Industrial Environment".

*Primary Examiner*—Leo P. Picard
*Assistant Examiner*—Michael W. Phillips

[57] ABSTRACT

A disk drive holder and interconnection system comprises a case, a drive frame, a release mechanism and electrical coupling device. The case holds a plurality of disk drives. Each disk drive is mounted in the case with a drive frame that has a flush release mechanism and a retaining mechanism. The drive frame has guides that are received by slots on the case as the disk drive and frame slide in and out of the case. The release mechanism is used to force the frame away from the case for removal. The system also includes a plurality of electrical connectors and a bus. A first connector provides external access to the bus. The remaining connectors are mounted to a backplane for mating with connectors on the drive frames, thereby coupling the connectors to disk drives automatically as the drive frame slides into the case. The holder also includes an air filter, a fan, a power supply and a distribution system mounted inside the case.

18 Claims, 7 Drawing Sheets

DISK DRIVE HOLDER AND INTERCONNECTION SYSTEM

BACKGROUND OF THE INVENTION

1. Field of the Invention

The present invention relates to storage and interconnection systems. In particular, the present invention relates to a holder and interconnection system for standard form factor small computer system interface (SCSI) drives that provides simple installation and removal of disk drives.

2. Description of Related Art

Many present day computer systems are coupled to or include disk drives for storing and retrieving information. In many computer systems, the disk drives are mounted inside the computer case to a chassis. Installing or removing such disk drives requires that the case be partially disassembled to gain access to the disk drive and chassis upon which the disk drive is mounted. The disk drive is then installed or removed by fastening or unfastening mounting screws. These screws are often located in areas that are difficult to reach because movement is constrained by the other components coupled to the chassis. Once mounted, the drive must also be connected to the bus or an input/output (I/O) port, as well as power sources. Typically, this is preformed by connecting the disk drive's outputs and inputs to a bus connector with jumper cables. Thus, the installation, removal and maintenance of a disk drive can be very time consuming and labor intensive.

While many computer systems provide enough room for two or three disk drives, the space in the computer case is commonly occupied by a hard disk drive and floppy disk drives. Thus, there is no room to accommodate a CD-ROM drive. Moreover, it is often advantageous to couple many CD-ROM drives to a system. "External" or stand-alone CD-ROM drives are commonly coupled to the bus of the computer system to overcome this problem. However, there are several problems associated with the use of external disk drives. First, the external disk drives are often stacked near the computer which is awkward. The external disk drives clutter the desktop and are inconvenient. Second, such external disk drives often require a housing to protect the electronic components of the disk drive from being damaged. Even with a housing, external disk drives are often damaged since the drives are not mounted to the computer's case and subjected to more movement. Third, external disk drives must also endure undesirable heat and dust conditions. External disk drives occupy additional space and are very bulky, which is a particular disadvantage if the drive is located on the desktop. Finally, externals disk drives are open and accessible to any user.

Other problems with disk drives and storage systems include the difficulty in connecting the drives to the system or mounting the drives in storage containers. Additionally, most storage containers do not provide an area to store floppy disks or CDs. This is a problem since CDs are often misplaced and removed with authorization. Moreover, most drives and storage systems do not provide any safeguards to prevent the drives or the disks from being removed or misplaced.

Therefore, there is a need for a system for storing and easily interconnecting disk drives without the costs and shortcomings of the prior art.

SUMMARY OF THE INVENTION

The present invention overcomes the deficiencies of the prior art by providing a disk drive holder and interconnection system that facilitates removal and installation of disk drives. A preferred embodiment of the disk drive holder and interconnection system of the present invention comprises a case, a drive frame, a release mechanism and an electrical coupling means. The case is preferably sized to hold a plurality of disk drives and has a first and a second interior walls. The case also provides an enclosed storage area for holding removable media such as floppy disks and CDs. Each disk drive is mounted in the case using a respective drive frame. The drive frame is attached to the disk drive, and has guiding means that are received by slots in the first and second interior sides. The slots and guiding means mate so that disk drives may be easily mounted and removed from the case by sliding the disk drive and frame in and out of the case. The release mechanism is pivotally mounted on the drive frame to be movable between a first position where the release mechanism is flush with the sides of the drive frame and a second position where the release mechanism extends outward beyond the sides of the drive frame to force the frame away from the case. The system of the present invention also includes electrical coupling means that includes a plurality of connectors and a bus. A first connector is mounted in a rear wall of the case to provide access to the bus from the exterior. The remaining connectors are mounted to a backplane that is centered in the case so that the connectors mate with connectors on the drive frames, thereby, coupling the connectors for successive drives together with a bus.

The preferred embodiment of the present invention also includes an air filter, a fan, a power supply and a distribution system mounted inside the case. The filter purifies the air circulated by the fan to cool the disk drives mounted in the system of the present invention. The power supply provides power for each disk drive mounted in the case. The distribution system couples each individual drive to the power supply, and advantageously does so with connectors mounted to the backplane and each drive frame, thus, preserving the easy installation and removal of CD-ROM drives provided by the present invention.

DETAILED DESCRIPTION OF THE PREFERRED EMBODIMENTS

Figure 1A:
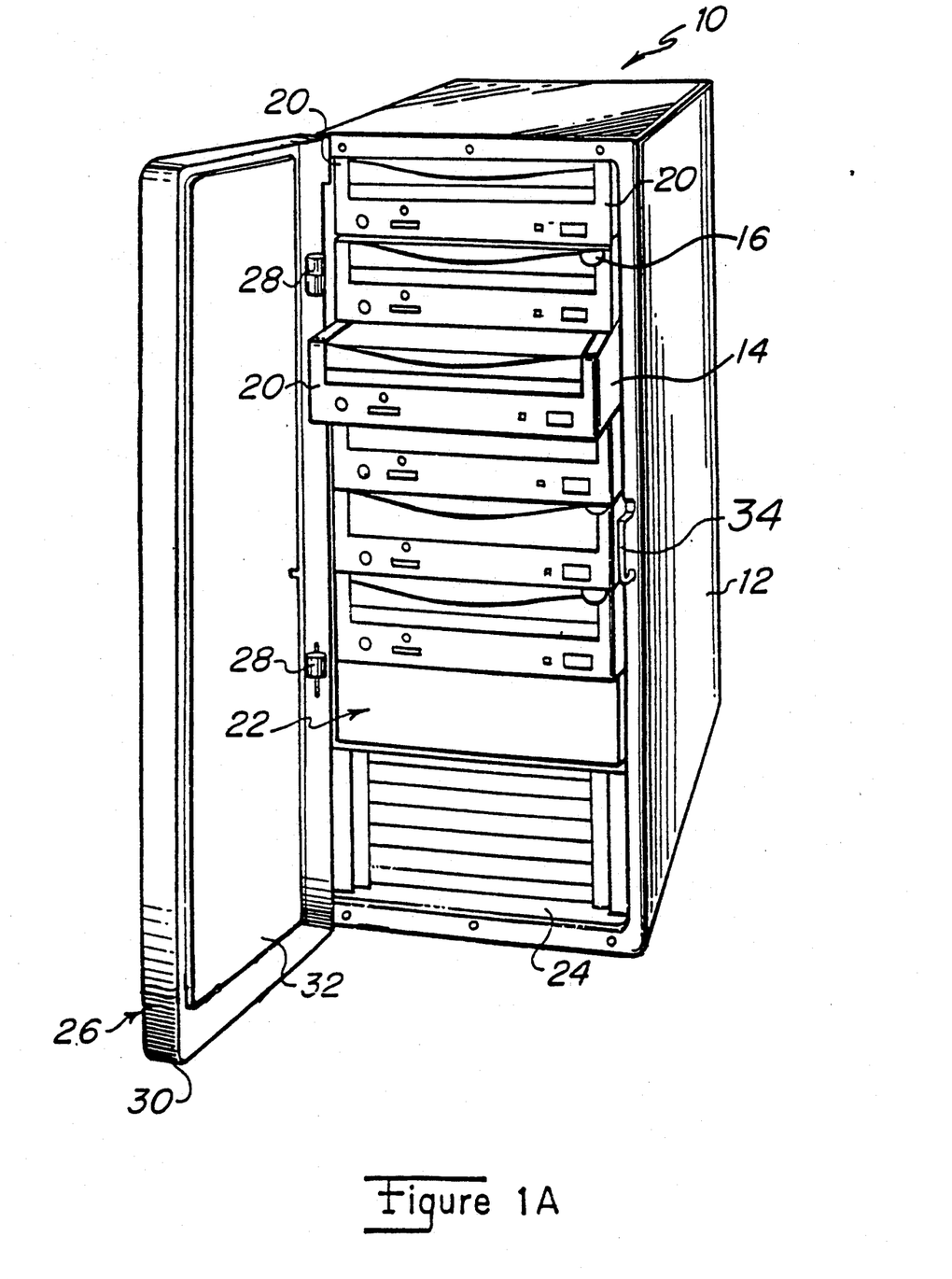
FIG. 1A is a front perspective view of a preferred embodiment of a drive holder of the present invention with the door in an open position.
Figure 1B:
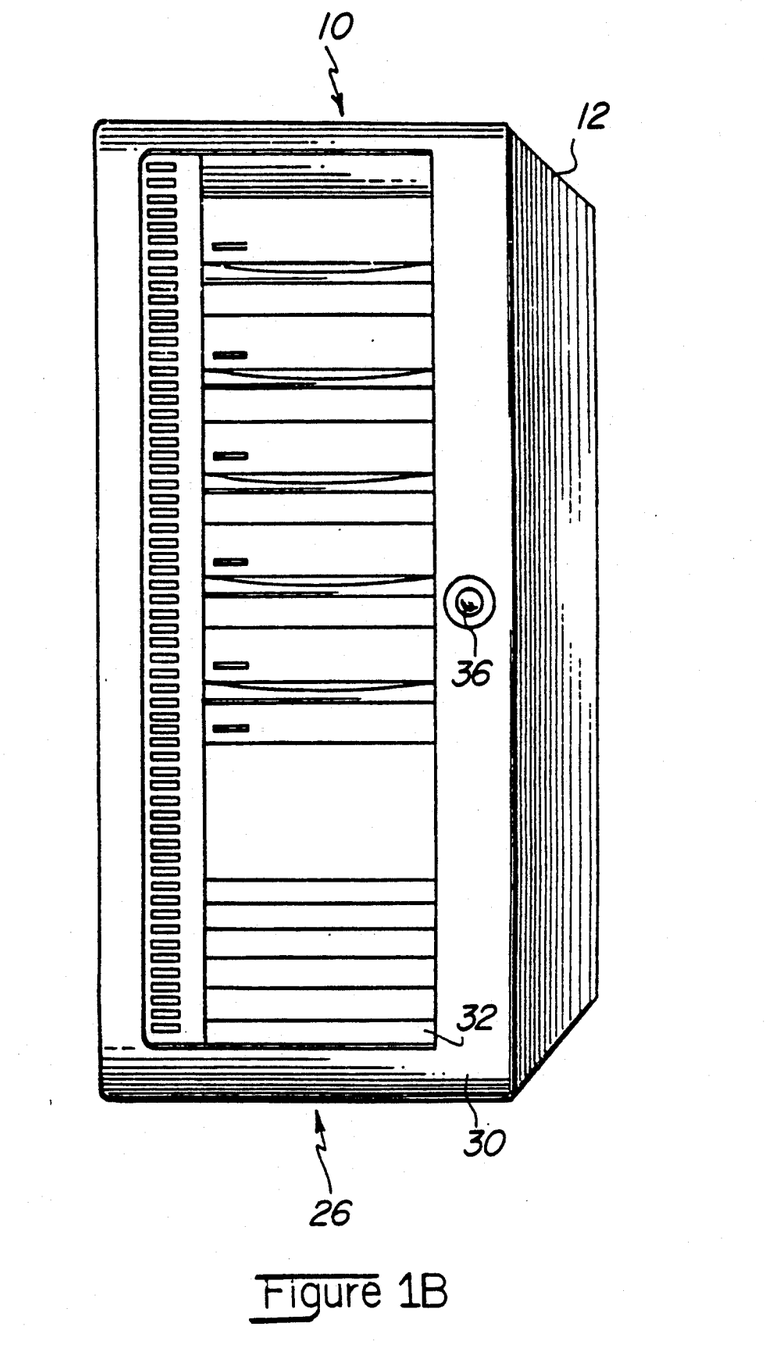
FIG. 1B is a front perspective view of the preferred embodiment of the drive holder of the present invention with the door in a closed position.

Referring now to FIGS. 1A and 1B, a preferred embodiment of a disk drive holder and interconnection system 10 constructed in accordance with the present invention is shown. The disk drive holder 10 preferably comprises a case 12, a drive frame 14, a release mechanism 16 and an electrical coupling means (not shown). While the preferred embodiment of the present invention will be described with reference to CD-ROM drives, it should be understood that the drive holder and interconnection system 10 of the present invention may also be used for hard disk drives and floppy disk drives.

As shown in the figures, the case 12 is preferably rectangular and sized to hold a plurality of disk drives 20. The exemplary case 12 shown in the figures is sized to accomodate seven CD-ROM drives. The case 12 is preferably constructed of dual wall sheet metal to provide a cavity 22. The cavity 22 is rectangular and divided into two portions. A lower portion 24 provides an area for storing removable media such as compact discs. The lower portion 24 serves as an enclosable storage area which is particularly advantageous because it prevents compact discs from being misplaced and lost.

As shown best by FIG. 1A, the cavity 22 can be enclosed by a door 26. The door 26 is preferably constructed of a metal frame 30 with a glass panel 32 which advantageously allows the contents of the case 12 to be viewed when the door 26 is closed. The door 26 is attached to the front of the case 12 by a pair of hinges 28 that allow the door 26 to swing between the open position of FIG. 1A and the closed position of FIG. 1B. The present invention also includes a latch 34 and a lock 36 to secure the door 26 in the closed position. The latch 34 is preferably mounted to the front edge of the case 12 at mid-level on the side opposite from the hinges 28.

Figure 2:
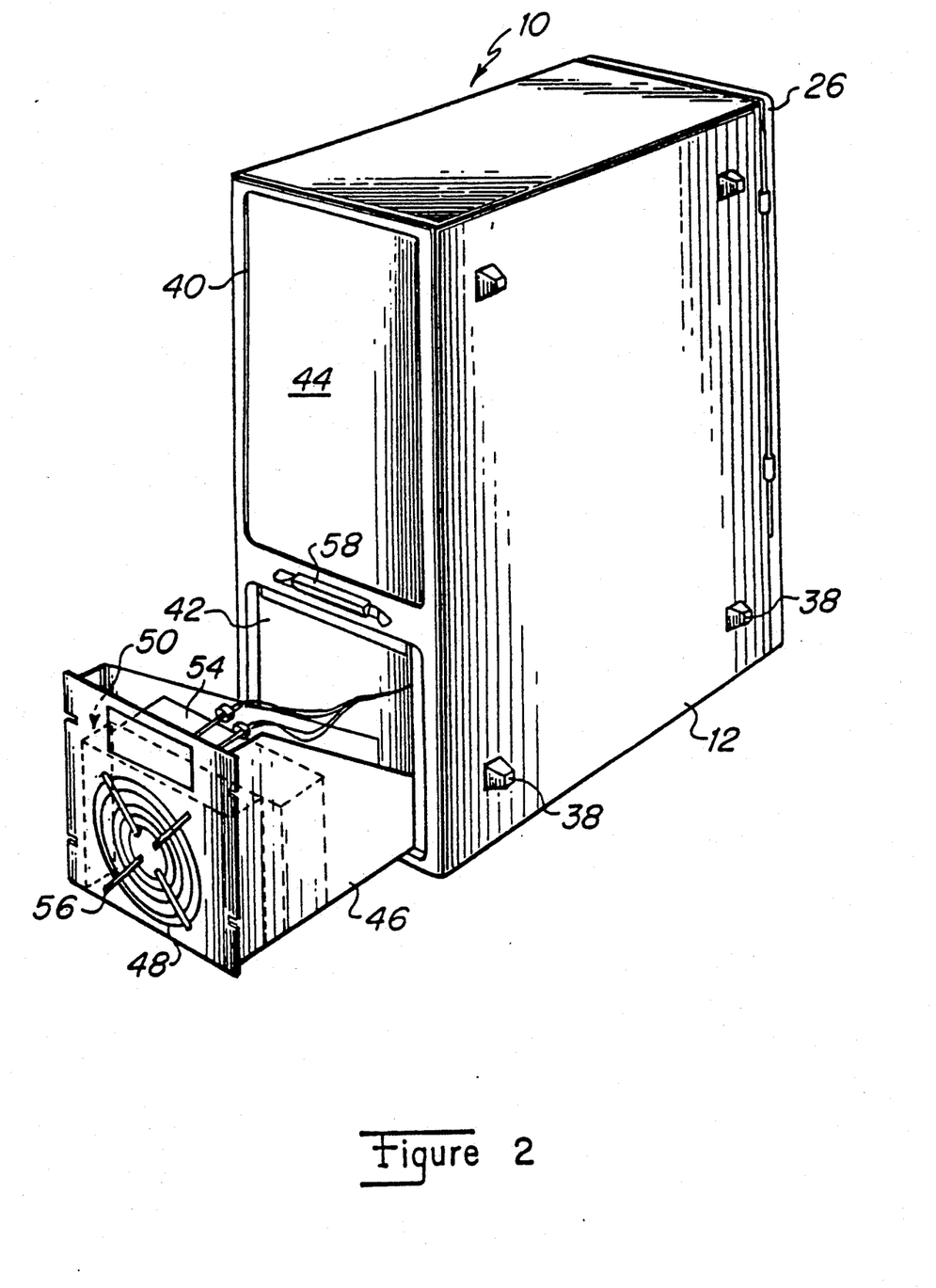
FIG. 2 is a rear perspective view of the preferred embodiment of the drive holder of the present invention.

Referring now to FIG. 2, a rear perspective view of the drive holder 10 is shown. The rear side of the case 12 provides two openings 40, 42. The upper opening 40 is preferably covered by a panel 44. The panel 44 may be removed to gain access to the interior of the case 12 and the electrical coupling means (not shown) by unscrewing fasteners (not shown) about the periphery of the panel 44. The lower opening 42 is sized to receive a sled 46. The sled 46 houses a fan 50 and a power supply 54. The sled 46 slides in and out of the lower opening 42 to permit user access to the power supply 54 and fan 50. The sled 46 has an opening 48 for air to exit/enter the case 12 for cooling purposes. The opening 48 is covered by a grate 56 on the exterior. The grate 56 provides protection from the fan 50. Once the sled 46 is positioned inside the case 12, it can be secured into place with fasteners about the periphery of the exterior side of the sled 46. Between the two openings 40 and 42 a connector 58 is mounted to the case 12. The connector 58 has its interior end coupled to each of the disk drives 20 as will be described below. The connector 58 is preferably a 50 pin connector and used to couple a plurality of lines to a bus (not shown) of a computer (not shown). Finally, a plurality of pads 38 are preferably mounted on one side of the exterior of the case 12. Proximate each corner, a pad 38 is attached to the exterior of the case 12 for positioning the case 12 in a horizontal position.

Figure 3:
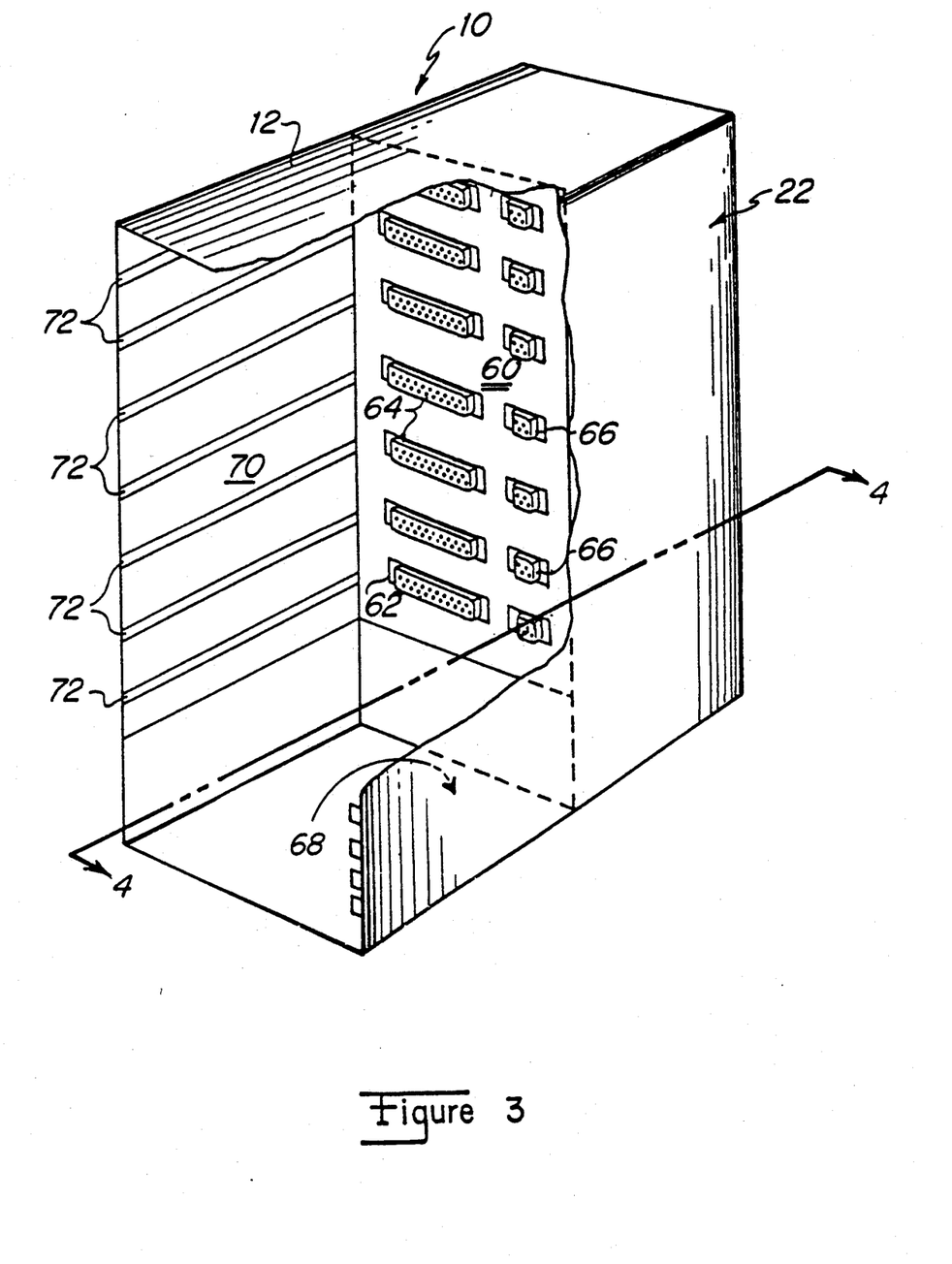
FIG. 3 is a perspective view, partially in section, of the case of the present invention.

Referring now to FIG. 3, the cavity 22 of the case 12 is shown in detail. The cavity 22 is divided by a backplane 60. The backplane 60 is mounted inside the cavity 22 substantially perpendicular to a first and a second interior walls 68, 70 of the cavity 22. The backplane 60 is preferably a sheet of metal defining a plurality of holes 62. In the preferred embodiment that is designed to allow up to seven disk drives to be mounted in the case 12, the backplane 60 provides 14 holes 62. Two holes 62 are provided at seven different levels corresponding to the levels at which each of the disk drives 20 is located when mounted in the holder 10. One hole 62 at each level is used to hold a bus connector 64 and the other hole 62 is used to hold a power connector 66 that form part of the electrical coupling means 18 as will be described with reference to FIG. 4.

Figure 4:
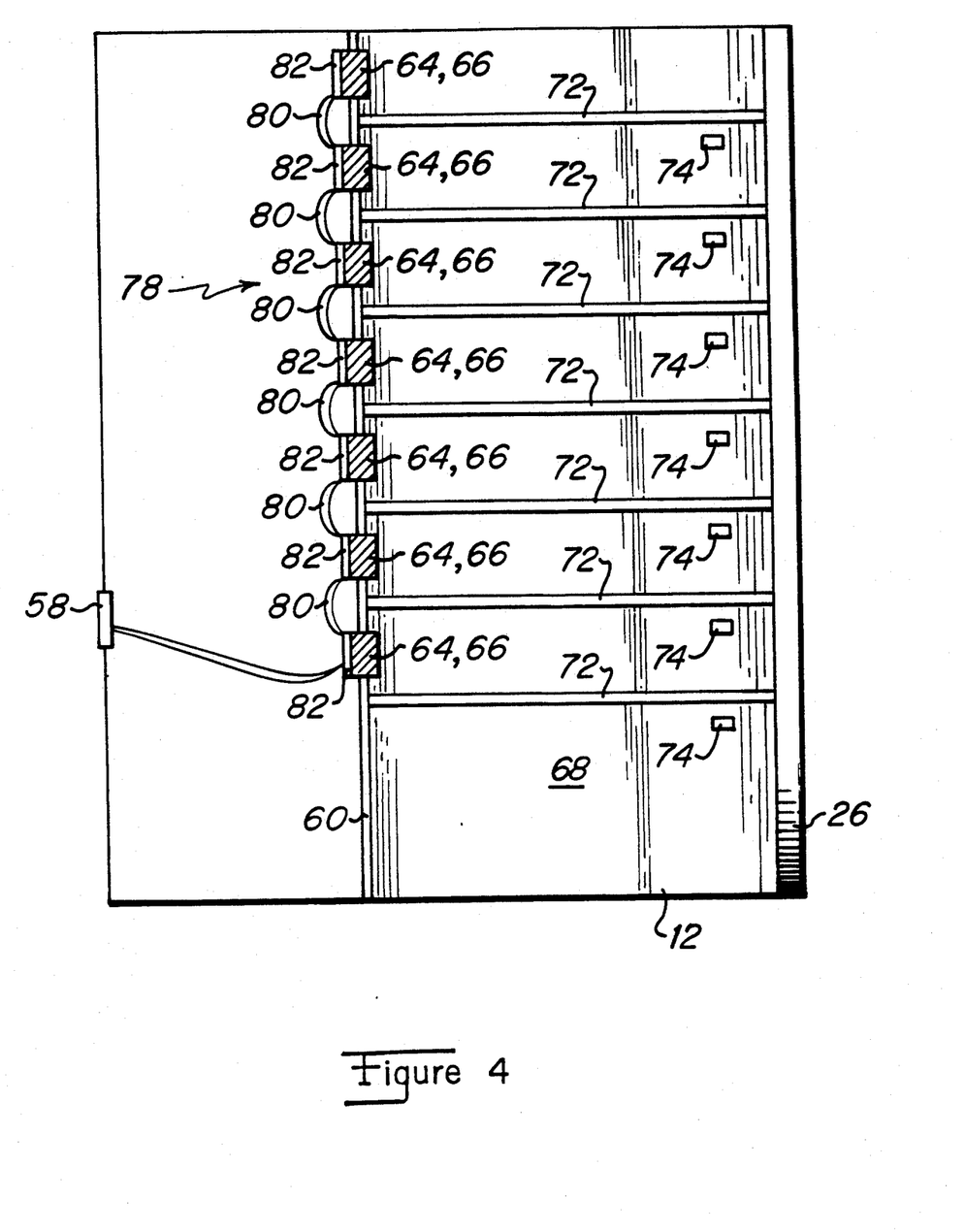
FIG. 4 is a side view of the drive holder and interconnection system of the present invention taken along lines 4—4 of FIG. 3.
Figure 5:
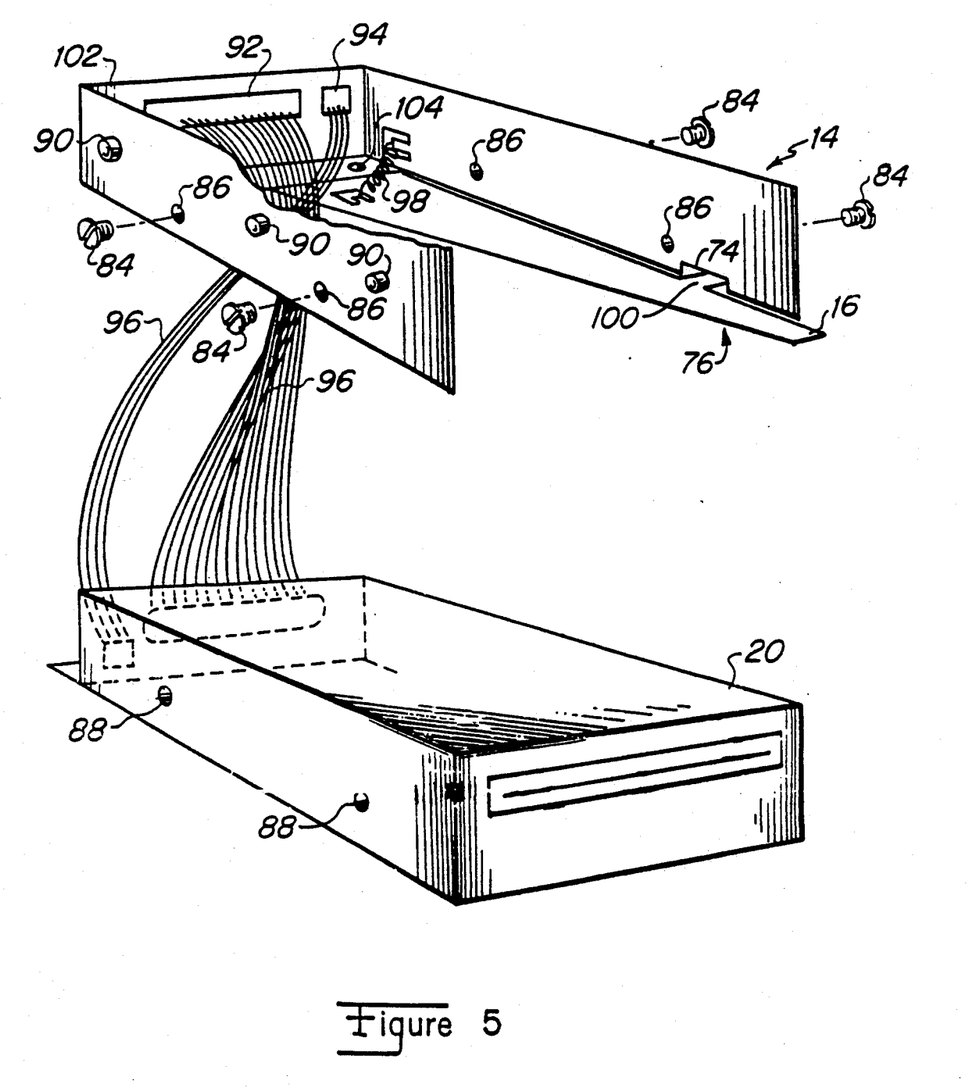
FIG. 5 is an exploded perspective view of a preferred embodiment of a drive frame of the present invention and a CD-ROM drive.

As shown in FIGS. 3 and 4, the first and second interior walls 68, 70 of the cavity 22 define a mounting means. The mounting means comprises a plurality of slots 72. The slots 72 are positioned substantially parallel on the interior walls 68, 70 of the cavity 22, and extend in a substantially horizontal direction from the front of the case 22 towards the backplane 60. There are preferably two slots 72 (one on each of the interior walls 68, 70) corresponding to each disk drive 20. Thus, there are seven slots 72 on the first interior wall 68, and seven slots 72 on the second interior wall 70. At each level, the slots 72 on the interior walls 68, 70 are aligned so that the disk drive 20 slides into position using the slots 72. As illustrated in FIG. 4, on the first interior wall 68 near the front of the case 12, there are also a plurality of notches 74. Each notch 74 is positioned just below a respective slot 72. The notches 74 are sized to receive a protrusion 100 (FIG. 5) of release mechanism 16 (FIG. 5). The protuberance 100 (FIG. 5), along with notch 74, is used to hold the disk drives 20 inside the case 12 in a connected position.

FIG. 4 also illustrates the electrical coupling means 18 that comprises a plurality of power and bus connectors 64, 66 that are mounted in the holes 62 in the backplane 60. The connectors 64, 66 are advantageously positioned in the backplane 60 such that one end of the each connector 64, 66 can be electrically coupled to the outputs of the disk drive 20 (FIG. 1) and the other end of the connectors 64, 66 can be coupled to the power supply 54 (FIG. 2) and a bus 78, respectively. In an exemplary embodiment, the bus connectors 64 are 50 pin connectors as known and used with the SCSI (Small Computer System Interface), and the power connectors 66 are four pin connectors. In the embodiment shown in FIG. 4, the bus 78 is formed from a plurality of 50 pin connectors 82 and ribbon cables 80. However, it should be understood that those skilled in art could construct the bus 78 in other ways such as mounting the connectors 64, 66 to a mother board or printed circuit board comprising a bus and attaching the motherboard to the backplane 60.

Referring now to FIG. 5, the preferred embodiment for the drive frame 14 is shown. The present invention advantageously provides a drive frame 14 for each disk drive 20 to be inserted into the case 12. In an exemplary embodiment, the drive frame 14 is a U-shaped band of metal adapted to cover the rear and sides of the disk drive 20. On a rear wall 102 of the drive frame 14, two apertures are defined. The apertures are used to house a bus connector 92 and a power connector 94. One end of the connectors 92, 94 is attached to cables 96 for coupling to the inputs, outputs and power of disk drive 20. The connectors 92, 94 correspond respect with the connectors 64, 66 on the backplane 60 for coupling the inputs/outputs of the disk drive 20 to the bus 78 and for coupling the power supply 54 to the disk drive 20. The apertures advantageously position the connectors 92, 94 so that their other end automatically mates with the connectors 64, 66 respectively on the backplane 60 as the drive frame 14 slides into the case 12. The drive frame 14 is attached to its respective disk drive 20 using a plurality of screws 84 that are received in holes 86, 88 on the sides of in the disk frame 14 and the disk drive 20, respectively. On each exterior side of the drive frame 14, there are a plurality of guide pins 90. The guide pins 90 are aligned horizontally for sliding engagement in the slots 72 of the case 12. As noted above, the guide pins 90 and the connectors 92, 94 are relatively positioned so that the connectors 92, 94 automatically couple with connectors 64, 66 to provide an electrical connection as the disk drive 20 slides into the case 12.

Figure 6:
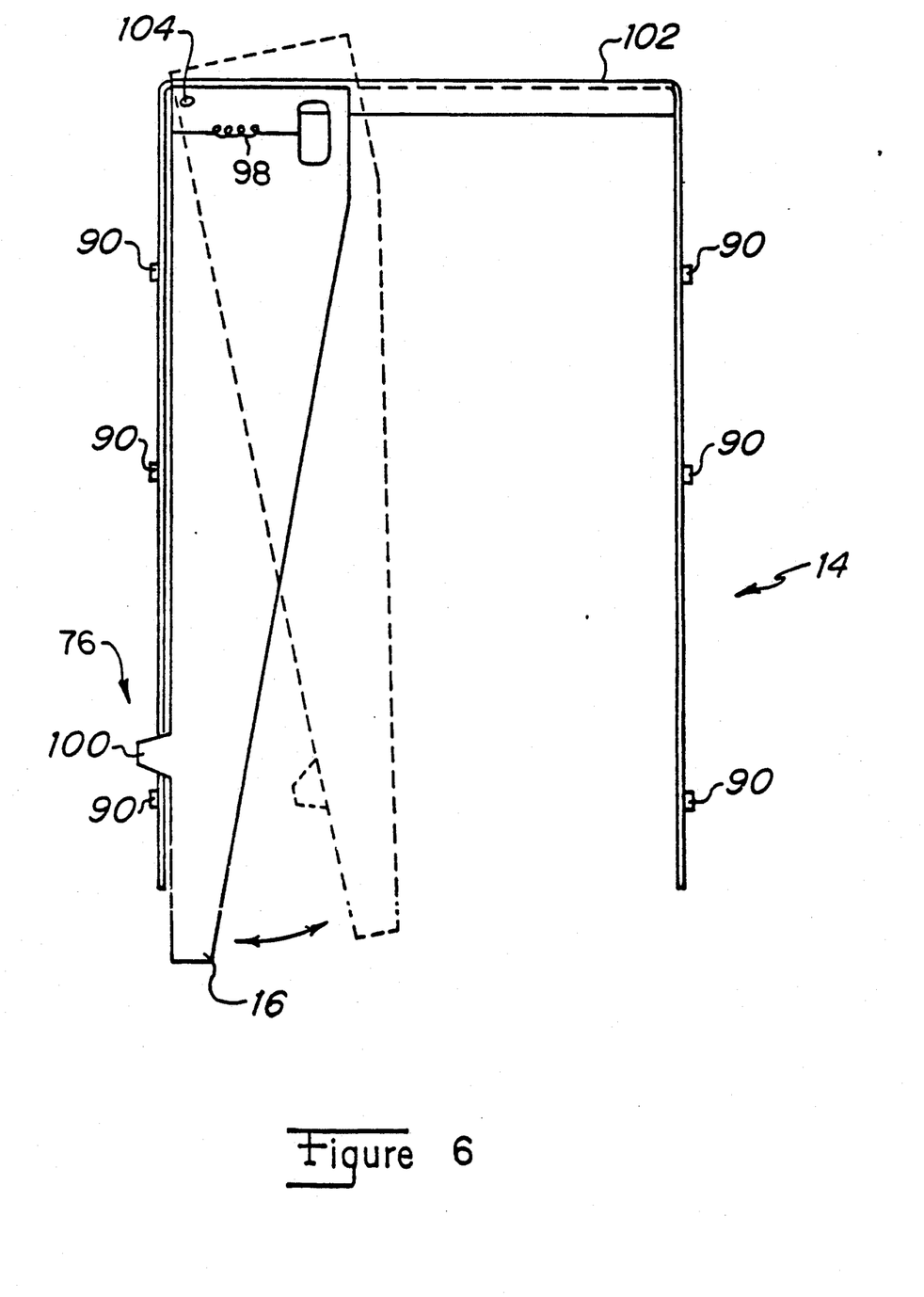
FIG. 6 is bottom plan view of the drive frame of the present invention showing movement of a lever arm.

As shown in FIG. 5, the release mechanism 16 is preferably a lever. The release mechanism 16 has a generally triangular shape and is pivotably mounted to the bottom right corner of the drive frame 14. The release mechanism 16 is rotatable about the pivot mount 104 between a position where the release mechanism 16 is substantially right flush with the side of the drive frame 14 to a position where the release mechanism 16 is distal the right side as shown best in FIG. 6. Referring now to FIG. 6, as release mechanism 16 is rotated, its rear edge moves from a position substantially flush with the rear wall 102 of the drive frame 14 to a position where the release mechanism 16 extends beyond the rear wall 102 of the drive frame 14. With such movement, the release mechanism 16 effectively pushes the drive frame 14 away from the backplane 60 (FIG. 4), thereby, disengaging the connectors 64, 66, from connectors 92, 94 respectively. The drive frame 14 and the disk drive 20 can then be easily removed by continuing to slide the disk drive 20 out of the case 12. The preferred embodiment preferably includes a spring 98 mounted between the left side of the drive frame 14 and the lever 16. The spring 98 advantageously retains the release mechanism 16 substantially flush with the left side of the frame 14 while allowing the lever 16 to be rotated when force is applied. FIG. 6 also demonstrates the retaining mechanism 76 that holds drive 20 and frame 14 in the case 12. Retaining mechanism 76 includes protuberance 100 of release mechanism 16 and notch 74. On the side of the release mechanism 16 proximate the drive frame 14, there is a protrusion 100. In this position, the protrusion 100 is inserted into the notch 74 when the disk frame 14 is fully inserted into the case 12. The protrusion 100 extends beyond the side of the drive frame 14 when the lever 16 is substantially flush with the left side of the drive frame 14. The protrusion 100 is sized to fit in the notch 74 on the interior wall of the case 12. However, when the lever 16 is rotated, the protrusion 100 is removed from the notch 74 which allows the drive 20 and frame 14 to slide out of the case.

Having described the present invention with reference to specific embodiments, the above description is intended to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the present invention.

What is claimed is:

1. A system for storing and interconnecting a plurality of disk drives, said system comprising:

a case defining a first cavity with first and second interior walls;

a frame having sides, said sides having means for guiding said frame into said case;

a release mechanism mounted on the frame, said release mechanism movable between a first position where a first and a second edge of said release mechanism are substantially flush with a first and second side of the frame respectively and a second position where said second edge of the release mechanism extends outward beyond said second side of the frame to force the frame away from the case;

mounting means on the first and second interior walls of the case, said mounting means adapted to receive the means for guiding the frame into and out of the case; and retaining means, coupled to the frame, for retaining the frame mounted inside the case, said retaining means including an aperture in the first interior wall and a protrusion on the release mechanism which extends beyond the sides of the frame into the aperture when the frame is positioned inside the case.

2. The system of claim 1 wherein the guiding means are a plurality of pins aligned linearly along opposite sides of the frame.

3. The system of claim 1 wherein the release mechanism is a lever that is pivotably attached near a corner of the frame.

4. The system of claim 3 wherein the release mechanism further comprises a spring to hold the lever in the first position while allowing movement of the lever into the second position.

5. The system of claim 1 wherein the mounting means is a plurality of slots in the first and second interior walls of the case, each slot in the first interior wall having a corresponding slot in the second interior wall at the same level, said slots beginning at the edge of the cavity and extending into the cavity along the walls.

6. The system of claim 1 wherein the case has a second cavity and further comprises a fan and an air filter for circulating and purifying the air in the case for cooling, the fan mounted in said second cavity.

7. The system of claim 1 further comprising a door, said door mounted to the case with hinges, said door enclosing said first cavity in a closed position and swinging to an open position that allows disk drives to be inserted and removed.

8. The system of claim 6 further comprising a lock mounted on the door to secure the door in said closed position.

9. The system of claim 1 further comprising an electrical coupling means for connecting the plurality of disk drives, said electrical coupling means comprising:

a bus;

a backplane mounted to said case; and a plurality of electrical connectors, a first of said plurality of connectors mounted to the case and coupled to the bus to provide access to the bus from outside the case, the rest of said plurality of connectors coupled to the bus and mounted to the backplane for coupling a respective disk drive to the bus.

10. The system of claim 9 wherein the bus is a ribbon cable and a plurality of connectors.

11. The system of claim 9 wherein the bus is a printed circuit board mounted to the backplane and coupled to the connectors.

12. The system of claim 9 wherein the frame further comprises ribbon cable, a power connector and a bus connector positioned on the frame to mate with respective connectors on the backplane when the frame is completely inserted into the case, said ribbon cable for coupling inputs and outputs of a disk drive to the bus.

13. The system of claim 1, further comprising a distribution system and a power supply for providing power to each of the plurality of disk drives inserted into the case, said distribution system for coupling each of the plurality of disk drives to the power supply.

14. The system of claim 1, wherein the first cavity defined by the case further comprises a lower portion and upper portion, the upper portion providing a storage area for the plurality of disk drives, and the lower portion providing a storage area for removable disk media.

15. A mounting device for a disk drive, said mounting device comprising:

a frame having sides, said sides having means for guiding said frame into a case, said frame adapted for attachment to said disk drive; and a release mechanism mounted on the frame, said release mechanism movable between a first position where a first and a second edge of said release mechanism are substantially flush with a first and second side of the frame respectively and a second position where said second edge of the release mechanism extends outward beyond said second side of the frame; and a retaining mechanism coupled to the frame for retaining the frame in a mounted position.

16. The device of claim 15 wherein the guiding means are a plurality of pins aligned linearly along opposite sides of the frame.

17. The device of claim 15 wherein the release mechanism is a lever and a spring, said lever pivotably attached near a corner of the frame and said spring mounted to hold the lever in a first position while allowing movement of the lever into the second position.

18. The device of claim 15 wherein the frame further comprises ribbon cable, a power connector and a bus connector positioned on the frame, said ribbon cable for coupling inputs and outputs of the disk drive to the bus.

* * * * *